United States Patent [19]

Matsuoka

[11] 4,254,375

[45] Mar. 3, 1981

[54] METER SYSTEM FOR INDICATING A PLURALITY OF VARIABLES WITH A SINGLE METER

[75] Inventor: Hideoki Matsuoka, Yokohama, Japan

[73] Assignee: Nissan Motor Company, Limited, Yokohama, Japan

[21] Appl. No.: 4,523

[22] Filed: Jan. 18, 1979

[30] Foreign Application Priority Data

Mar. 4, 1978 [JP] Japan .................................. 53-25297

[51] Int. Cl.$^3$ .......................................... G01R 15/08
[52] U.S. Cl. ..................................... 324/115; 73/344; 324/73 R; 324/140 R
[58] Field of Search ............... 324/115, 157, 156, 131, 324/140 R, 114, 73 R; 116/286, 287; 362/26, 31; 340/52 R; 73/344, 292

[56] References Cited

U.S. PATENT DOCUMENTS

| | | | |
|---|---|---|---|
| 2,221,115 | 11/1940 | Shepard, Jr. | 324/121 R |
| 2,512,330 | 6/1950 | Hendrich | 324/115 |
| 2,972,978 | 2/1961 | Collison | 116/287 |

FOREIGN PATENT DOCUMENTS 2115815 10/1972 Fed. Rep. of Germany ........... 324/115

*Primary Examiner*—Ernest F. Karlsen
*Attorney, Agent, or Firm*—Schwartz, Jeffery, Schwaab, Mack, Blumenthal & Koch

[57] ABSTRACT

A meter system for indicating a plurality of variables with a single meter comprises a first switch for selectively supplying one variable to the meter, a plurality of dial plates which are arranged such that one of the dial plates is selectively displayed in correspondence with the selected variable by means of a second switch arranged to be operated together with the first switch.

5 Claims, 6 Drawing Figures

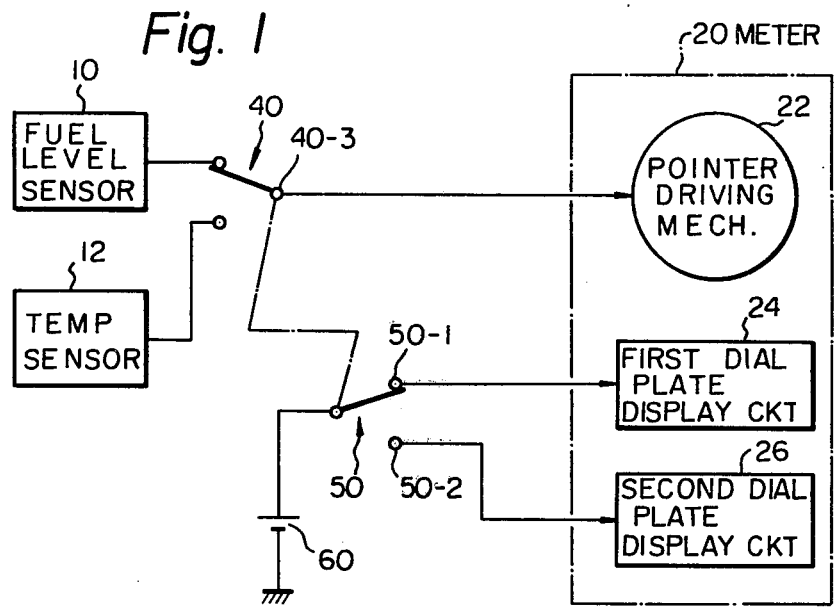
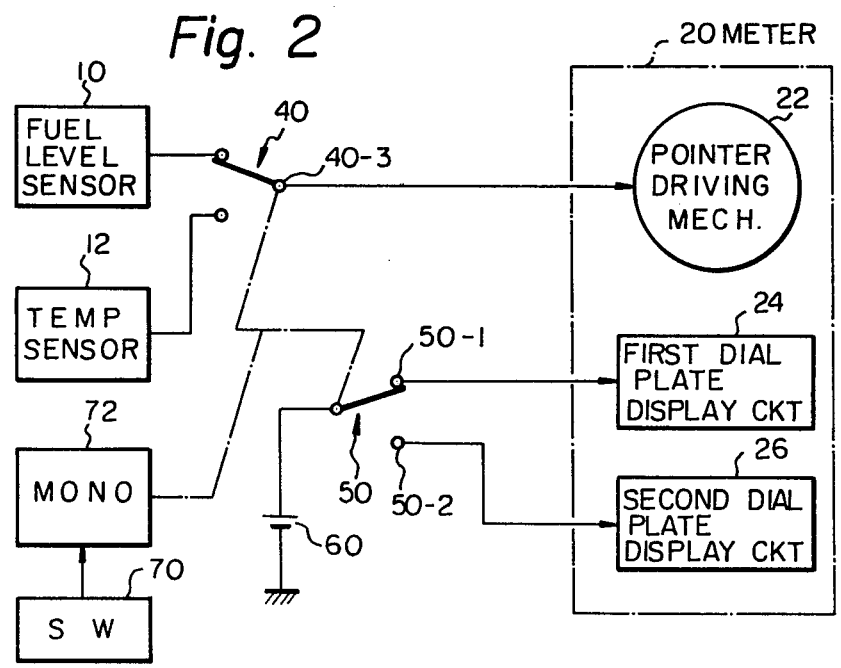

METER SYSTEM FOR INDICATING A PLURALITY OF VARIABLES WITH A SINGLE METER

FIELD OF THE INVENTION

This invention relates generally to an indicator system of variables. More specifically, the present invention relates to such a system responsive to electrical signals indicative of each variable.

BACKGROUND OF THE INVENTION

In an automotive vehicle, a plurality of meters is disposed on the instrument panel of the vehicle for indicating various engine parameters and other information respectively. Since each meter can indicate only a single variable, it is necessary to use a plurality of meters the number of which corresponds to the number of variables to be displayed. These meters are usually disposed on the instrument panel of the vehicle so that the vehicle driver can easily see the meters. Recent vehicles have a tendency to be equipped with a number of meters to supply the vehicle driver with more information. However, the space on the instrument panel is limited and therefore, it is required to use small meters when a number of meters are disposed thereon. Furthermore, stereophonic systems and air conditioning systems are widely used in the vehicle compartment and these systems occupy a relatively large space on and around the instrument panel. For the above reasons, it is desired to use a meter which can indicate a plurality of variables. It is possible to utilize a single meter for indicating two or more variables by switching the input signals where the dial plate of the meter has a plurality of scales corresponding to the variables. However, such a meter having more than two scales on the dial plate has a disadvantage in that it is difficult to ascertain the amount or value indicated by the pointer of the meter since each of the scales as well as numerals and/or symbols written adjacent to each scale is too small. Furthermore, since a plurality of scales is provided, misinterpretation of the displayed value is apt to occur, unless the user of the meter is careful about the item indicated.

SUMMARY OF THE INVENTION

The present invention has been developed in order to overcome the above-mentioned drawbacks of the conventional meter system. In accordance with the present invention, a plurality of independent signals is selectively supplied to the pointer driving mechanism of the meter, while the dial plate of the meter is arranged to automatically display a scale and numerals and/or letters corresponding to the item indicated by the pointer in correspondence with the selected signal.

It is therefore an object of the present invention to provide a meter system for indicating a plurality of variables in which a corresponding dial plate is selectively displayed.

Another object of the present invention is to provide such a meter system in which the number of meters required for an automotive vehicle is reduced.

Further object of the present invention is to provide such a meter in which the cost of the meter system of an automotive vehicle is reduced.

A still further object of the present invention is to provide such a meter in which the assembly process of the meter system is simplified.

Yet a further object of the present invention is to provide such a meter system in which the change of the item to be indicated by the meter is easily performed.

BRIEF DESCRIPTION OF THE DRAWINGS

These and other objects and features of the present invention will become more readily apparent from the following detailed description of the preferred embodiments taken in conjunction with the accompanying drawings in which:

FIG. 1 shows in schematic block diagram form a first preferred embodiment of the meter system according to the present invention;

FIG. 2 shows in schematic block diagram form a second preferred embodiment of the meter system according to the present invention;

DETAILED DESCRIPTION OF THE PREFERRED EMBODIMENTS

Figure 3:
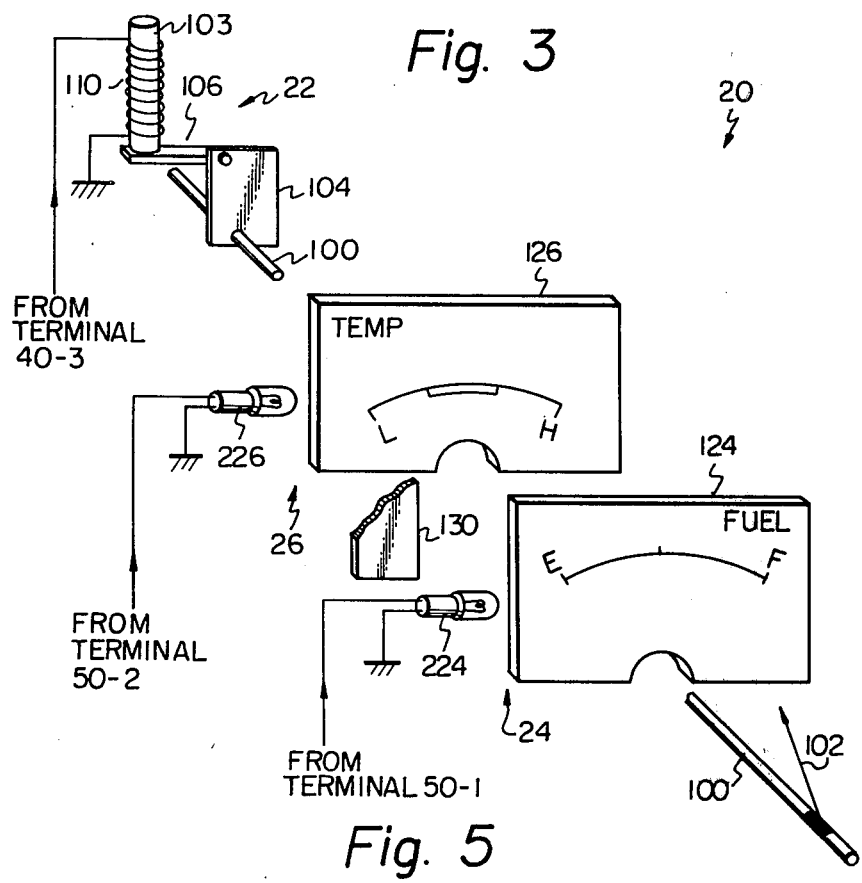
FIG. 3 shows an exploded perspective view of the meter shown in FIGS. 1 and 2.

Reference is now made to FIG. 1 which shows a first preferred embodiment of the meter system according to the present invention. The meter system shown in FIG. 1 is designed to be used for indicating the amount of fuel contained in the fuel tank of the vehicle ad the temperature of the engine. Although these two parameters are shown to be indicated in the embodiment, other variables such as oil pressure and charging current of the battery may take the place of these variables. The meter system shown in FIG. 1 consists of a first switch 40, a second switch 50, a power supply 60 (as shown in the form of a battery), and a meter 20. The meter 20 consists of a pointer driving mechanism 22, first dial plate display circuit 24, and a second dial plate display circuit 26. The detailed arrangement of the meter 20 is shown in FIG. 3 and the description thereof will be made hereinlater.

The first switch 40 and the second switch 50 are arranged to be operated simultaneously, or the two switches 40 and 50 may be included in a gang switch. These switches 40 and 50 are manual toggle switches and are arranged to be operated by the vehicle driver or an operator. The first switch 40 is arranged to connect either the output of the fuel level sensor 10 or the output of the temperature sensor 12 via a terminal 40-3 of the first SW 40 to an input of the pointer driving mechanism 22. The fuel level sensor 10 and the temperature sensor 12 are of conventional type and are respectively arranged to produce output analog signals the magnitude of which indicate the detected values. If necessary, a suitable amplifier and a function generator may be connected to the output of each of the sensors 10 and 12. The movable contact of the first switch 40 is shown to be at a position in which the output signal of the fuel level sensor 10 is supplied to the pointer driving mechanism 22.

The pointer driving mechanism 22 is of a conventional type, and is responsive to an electrical signal applied thereto. As well known, the pointer which is driven by the pointer driving mechanism 22 moves (usually rotates) to have a position in accordance with the magnitude of the signal.

The second switch 50 is arranged to supply an electric current fed from the battery 60 via respective terminals 50-1 and 50-2 to one of the first and second dial plate display circuits 24 and 26 included in the meter 20. Each of the first and second dial plate display circuits 24 and 26 consists of a transparent plate made of suitable material such as acrylic resin, and a conventional light-emitting element, such as a lamp or a light emitting diode. It will be seen that when the output signal of the fuel lever sensor 10 is applied to the pointer driving mechanism 22, the first dial plate display circuit 24 is energized so that a corresponding dial plate is illuminated.

FIG. 3 shows in an exploded view a detailed construction of the meter 20. The meter 20 consists of the pointer driving mechanism 22, a pointer 102 operatively connected to the pointer driving mechanism 22, and the first and second dial plate display circuits 24 and 26. The first dial plate display circuit 24 consists of a first transparent plate 124 and a first lamp 224 disposed at the edge portion of the first plate 124, while the second dial plate display circuit 26 consists of a second transparent plate 126 and a second lamp 226 disposed at the edge of the second plate 126.

The pointer driving mechanism 22 consists of a rotatable shaft 100 pivotally disposed on a stationary member (not shown), a plate 104 fixedly connected to the shaft 100, a bimetallic strip 106 fixedly connected to the plate 104, and a columnar member 103 fixedly connected to the bimetallic strip 106. The columnar member 103 has a winding 110 disposed thereon. The winding 110 is responsive to an electrical signal applied to the terminal 40-3 of the first switch 40 shown in FIG. 1. When an electrical signal is fed to the winding 110, the columnar member 103 is heated. The temperature of the heated columnar member 103 varies in accordance with the magnitude of the signal. As the temperature increases the bimetallic strip 106 tends to curl and thus the plate 104 and the shaft 100 rotates. In accordance with the rotational movement of the shaft 100, the position of the pointed head of the pointer 102 varies.

The first and second dial plates 124 and 126 are disposed behind the pointer substantially in parallel with each other and in layered fashion. The first dial plate 124 is for a fuel gauge and a suitable scale indicating the amount of fuel by symbols such as E and F which respectively stand for empty and full, is provided on the surface thereof. In addition to the scale, a word such as FUEL which indicates that the first dial plate 124 is for the fuel gauge is provided on the surface of the first dial plate 124. In the same manner, the second dial plate 126 has a scale for the temperature of the engine and a word such as TEMP. Although no numerals are shown in the scales, suitable numerals corresponding to the amount of fuel and the temperature may be provided respectively if desired. The above-mentioned scales and words indicating the items of the variables are arranged on each dial plate by carving the surface thereof.

A screen 130 is interposed between the first and second lamps 224 and 226 for blocking the transmission of the light emitted from the first lamp 224 to the second dial plate 126 and the transmission of the light emitted from the second lamp 226 to the first dial plate 124. When the movable contact of the second switch 50 shown in FIG. 1 is in a position to supply an electric current from the power supply 60 to the first dial plate display circuit 24 as shown, the first lamp 224 is energized.

When the first lamp 224 is energized, as described hereinabove, the light emitted from the first lamp 224 is transmitted to the left edge of the first dial plate 124. The light applied to the left side of the first dial plate 124 is propagated via the transparent material of the dial plate 124 to all portions thereof. The light reflects at the carved portions and thus the scale and the word indicating the item are illuminated so as to be visually displayed. With this provision, when the pointer 102 indicates the amount of fuel contained in the fuel tank, only the scale and the word carved on the first dial plate 124 are displayed, while the scale and the word carved on the second dial plate 126 are not displayed. In the same manner, when the temperature is indicated by the pointer 102, only the second dial plate 126 functions. Since the first dial plate 124 is transparent, the vehicle driver can see the second dial plate 126, i.e. the scale and the word carved thereon, through the first dial plate 124. Further, since the scales and the words are arranged on each dial plate in a manner that they do not overlap one another, each of the scales and the words can be seen very clearly. In other words, the carved portions of the first dial plate 124 are not obstacles for the scale and the word on the second dial plate 126.

Although in the above described first embodiment of the meter system, only two items are alternatively displayed in response to the output signals of the two sensors, the number of the items to be displayed may be increased if desired. Namely, it will be seen that the meter system according to the present invention may be used for displaying more than two variables when more than two dial plates such as those shown in FIG. 1 are disposed in layered fashion in the meter 20. In case of displaying more than two variables, the first and second switches 40 and 50 shown in FIG. 1 will be respectively substituted with multiple-contact switches such as rotary switches.

Reference is now made to FIG. 2 which shows the second embodiment of the meter system according to the present invention. The circuit arrangement shown in FIG. 2 is similar to that shown in FIG. 1 except that the first and second switches 40 and 50 are not of a manual type. The first and second switches 40 and 50 used in the second embodiment may be relay circuits or gate circuits which function as a double pole gang switch in response to a control signal applied thereto. A manual switch 70 and a monostable multivibrator 72 are provided for producing a control signal which is used as the relay energizing signal when relays are used as the switches 40 and 50, and as the gate signal when gate circuits are used as the same. The first and second switches 40 and 50 and the output of the monostable multivibrator 72 are shown connected by dot-dash lines for indicating that the first and second switches 40 and 50 are controlled by the output signal of the monostable multivibrator 72.

The monostable multivibrator 72 is responsive to a trigger signal produced by the manual switch 70 which may be of a push-button type, and is arranged to produce an output pulse signal the pulse width of which is predetermined. The pulse width of the output signal of the monostable multivibrator 72 is preferably selected to correspond to few seconds, such as five seconds. The first and second switches 40 and 50 are arranged to establish the connections as shown in FIG. 2 when no signal is applied thereto from the monostable multivibrator 72. Upon presence of the output pulse signal, the respective connections of the first and second switches 40 and 50 are changed for a predetermined period of time defined by the pulse width of the pulse signal. From the foregoing, it will be understood that the meter 20 normally indicates the amount of fuel, and the temperature is displayed only for a predetermined period of time, such as five seconds, when the switch 70 is operated. After the predetermined period of time, the amount of fuel is displayed again. The first and second dial plates 124 and 126 are respectively illuminated for showing the scales and the words provided thereon in correspondence with the signal supplied to the pointer driving mechanism 22, in the same manner as in the first embodiment.

In the second embodiment, although a monostable multivibrator 72 is utilized for providing a predetermined period of time for which one variable is displayed, other devices and circuits which function as a timer circuit may be used instead of the monostable multivibrator 72.

Figure 4:
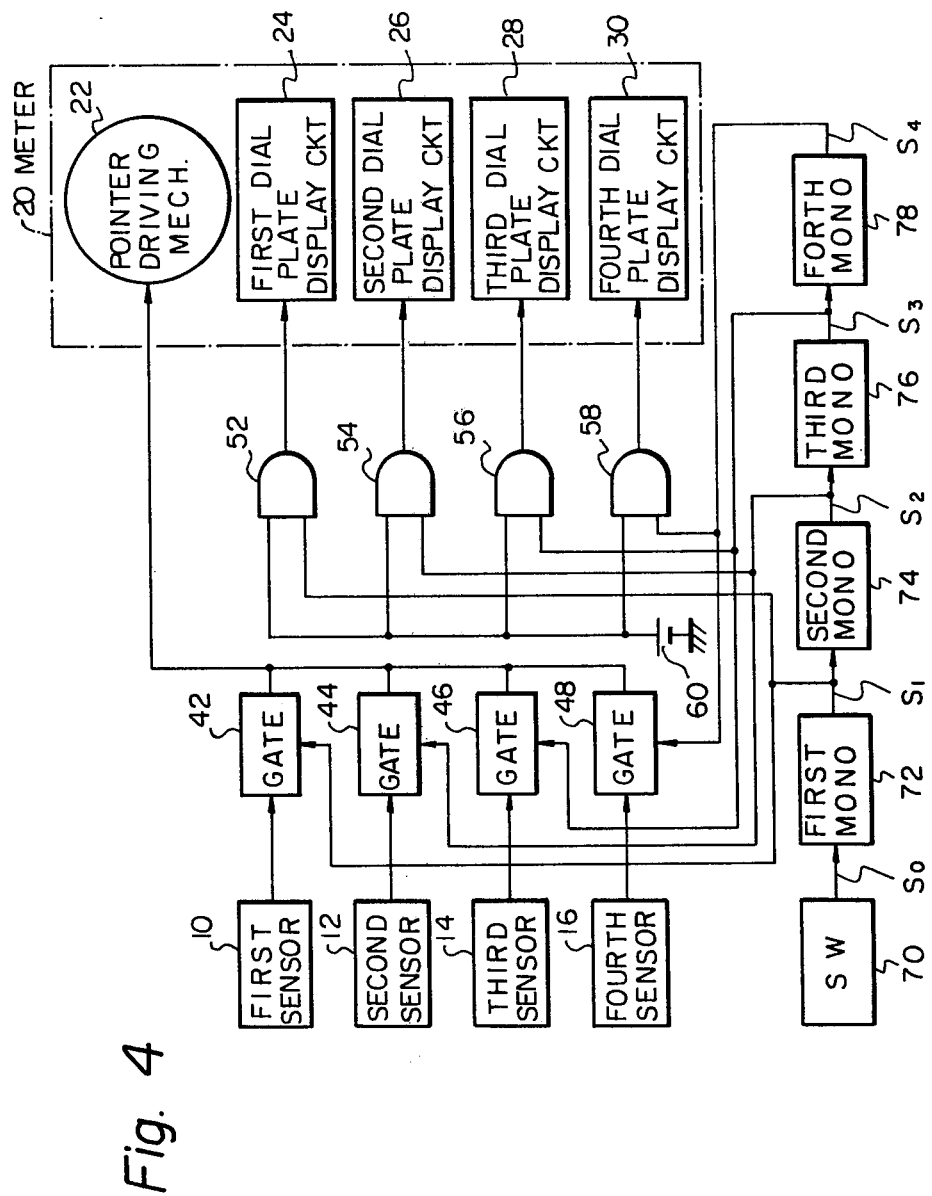
FIG. 4 shows in schematic block diagram form a third preferred embodiment of the meter system according to the present invention.

Reference is now made to FIG. 4 which shows the third embodiment of the meter system according to the present invention. The meter system shown in FIG. 4 is arranged to indicate four variables detected by four sensors 10, 12, 14 and 16. In this embodiment, electrical switches such as gate circuits 42 to 48 and 52 to 58 are used for selectively supplying the output signals of the sensors 10 to 16 to the pointer driving mechanism 22 and for selectively illuminating one of dial plates. Since the meter 20 is to indicate the four variables, the meter consists of four dial plates (not shown) which are arranged in the same manner as shown in FIG. 3. Each of the dial plates is arranged to be illuminated by a suitable illumination device in the same manner as described hereinbefore. The circuit arrangement of the third embodiment includes a manual switch 70 which may be of a push-button type, and four monostable multivibrators 72, 74, 76 and 78. The output signals of the four monostable multivibrators 72 to 78 are respectively supplied to the gate circuits 42 to 48 and 52 to 58 for controlling the gate circuits 42 to 48 and 52 to 58.

Figure 5:
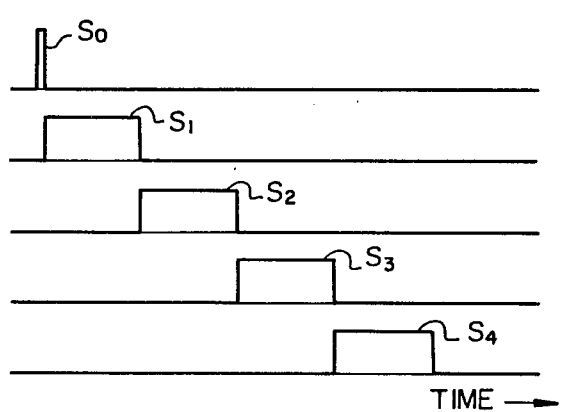
FIG. 5 shows a timing diagram of signals used in the third embodiment shown in FIG. 4.

Each of the four gate circuits 42 to 48 is of a conventional type and is arranged to transmit the input signal applied from the connected sensor 10, 12, 14 or 16 only when a gate signal is applied to the control terminal thereof from a connected monostable multivibrator 72, 74, 76 or 78. An output of the manual switch 70 is connected to an input of the first monostable multivibrator 72 the output of which is connected to an input of the second monostable multivibrator 74. The output of the second monostable multivibrator 74 is connected to an input of the third monostable multivibrator 76 the output of which is connected to an input of the fourth monostable multivibrator 78. Each of the monostable multivibrators 72 to 78 is arranged to produce a pulse signal of a predetermined pulse width in response to the trailing edge of the input signal. Since the first to fourth monostable multivibrators 72 to 78 are connected in series as described above, the output pulse signals $S_1$ to $S_4$ will be obtained as shown in FIG. 5 when a triggering pulse signal $S_0$ is produced by the manual switch 70.

The other four gate circuits 52 to 58 may be AND gates as shown in FIG. 4. A first input of each of the AND gates 52 to 58 is connected to the positive terminal of the power supply 60, the negative terminal of which connected to ground, while a second input of each of the AND gates 52 to 58 is connected respectively to the outputs of the first to fourth monostable multivibrators 72 to 78. Therefore, the electric current from the power supply 60 is successively supplied to the first to fourth dial plate display circuits 24 to 30 via the respective AND gates 52 to 58.

From the foregoing, it will be seen that the first dial plate is illuminated during a period of time for which the output signal of the first sensor 10 is applied via the first gate circuit 42 to the pointer driving mechanism 22. Of course the scales and letters provided in the form of carvings on the four dial plates are respectively arranged to correspond to the detected variables. After the first variable is indicated by the meter 20 for a predetermined period of time, such as for two seconds, the second variable indicated by the output signal of the second sensor 12 is indicated by the same pointer 102 of the meter 20 while the second dial plate is illuminated. In the same manner, the third and fourth variables are indicated in successive order. With this provision, the vehicle driver may ascertain four variables automatically within eight seconds when he operates the switch 70 once.

Figure 6:
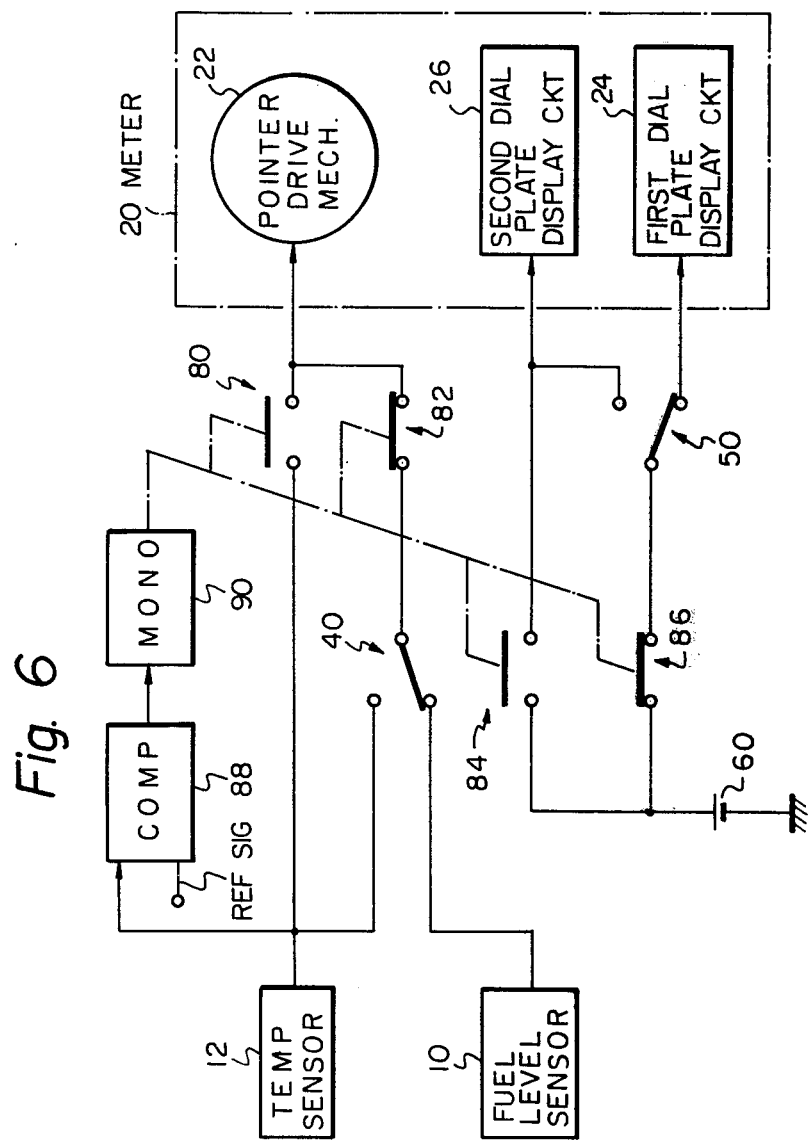
FIG. 6 shows in schematic block diagram form a fourth preferred embodiment of the meter system according to the present invention.

FIG. 6 illustrates the fourth embodiment of the meter system according to the present invention. The circuit arrangement shown in FIG. 6 is similar to that shown in FIG. 1 except that additional switches 80 to 86 are connected to the first and second switches 40 and 50. These additional switches 80, 82, 84 and 86 may be relays, the movable contacts of which are arranged to be controlled in response to a control signal produced by a monostable multivibrator 90. The monostable multivibrator 90 is responsive to an output signal of a comparator 88 which produces an output signal when the magnitude of the input signal thereof exceeds a predetermined value.

In this fourth embodiment, the comparator has a first input connected to the output of the temperature sensor 12, and a second input for receiving a reference signal which may be obtained via a suitable voltage divider (not shown). The cmparator 88 is arranged to produce an output signal when the temperature of the engine coolant exceeds a predetermined value by comparing the magnitude of the output signal of the temperature sensor 12 with that of the reference signal. The output signal of the comparator 88 is used as a trigger signal in the monostable multivibrator 90 and thus the monostable multivibrator 90 produces an output pulse signal the pulse width of which corresponds to a predetermined period of time. The relays 80 to 86 are arranged to function simultaneously as indicated by the dot-dash lines. The relay 82 is interposed between the first switch 40 and the input of the pointer driving mechanism 22 and is arranged to be closed (turned off) normally unless a relay energizing signal is applied thereto. The relay 86 is arranged to be normally closed in the same manner as the relay 82 and is interposed between the positive terminal of the power supply 60 and the second switch 50. When the relays 82 and 86 are closed as shown in FIG. 6, the circuit functions in the same manner as in the first embodiment shown in FIG. 1 for indicating one of the output signals of the fuel level sensor 10 and the temperature sensor 12.

When the temperature of the engine coolant exceeds a predetermined value, which corresponds to the overheat warning level of the engine temperature, the monostable multivibrator 90 produces a relay energizing signal so that the movable contacts of the relays 80 to 86 change the positions thereof. This means that the relays 80 and 84 become conductive (turn ON), while the relays 82 and 86 become nonconductive (turn OFF) for a period of time defined by the pulse width of the relay energizing signal from the monostable multivibrator 90. Consequently, the output signal of the temperature sensor 12 is fed to the pointer driving mechanism 22, while the second dial plate 126 is illuminated irrespectively of the positions of the movable contacts of the first and second switches 40 and 50. A suitable alarm device (not shown) such as a buzzer or a lamp may be actuated in response to the output signal of the monostable multivibrator 90 so that the vehicle driver can easily ascertain that the engine temperature has exceeded the predetermined value. Upon the notice of the alarm signal, the vehicle driver may watch the meter 22 so that the accurate temperature will be ascertained. After the above-mentioned predetermined period of time, the relays 80 to 86 return to the normal positions so that the vehicle driver may operate the toggle switch which actually includes the first and second switches 40 and 50 to select one of the variables to be displayed.

Although in the above described embodiments of the meter system, the scales and the letters are displayed via a plurality of dial plates which are of so-called edge light type as shown in FIG. 3, the dial plate of the meter 20 may be constructed by a single plate which is arranged to display various letters such as FUEL, E, F, TEMP, L and H on the surface thereof in response to electric signals. For instance, a fluorescent display unit or a liquid crystal display unit may be employed for displaying the above-mentioned various letters on a single plate.

Further, in FIG. 3 although the pointer driving mechanism 22 is shown to be of a bimetal actuated type, other arrangements such as a moving-coil type may also be employed.

It is, therefore, further understood by those skilled in the art that the foregoing descriptions are of preferred embodiments of the disclosed meter system and that various changes and modifications may be made in the invention without departing from the spirit and scope thereof.

What is claimed is:

1. A meter system for indicating a plurality of variables with a single meter, comprising:
    pointer driving means for driving a pointer which indicates the magnitude of one of said variables by the position of said pointer in response to an electrical signal indicative of said one of said variables;
    first switching means for selectively supplying an electrical signal indicative of one of said variables to said pointer driving means;
    dial plate means disposed adjacent to said pointer for providing scales which respectively correspond to said variables, said dial plate means including a plurality of dial plate display circuits for respectively displaying said scales;
    second switching means for selectively energizing one of said dial plate display circuits in correspondence with the selected variable;
    comparing means for producing a signal when the magnitude of a predetermined one of said variables exceeds a predetermined value;
    timer means responsive to the signal from the comparing means for producing a signal for a predetermined period of time;
    third switching means for transmitting only a signal indicative of said predetermined one of said variables to said pointer driving means upon presence of said signal from said timer means for said predetermined period of time, irrespective of the state of said first switching means; and
    fourth switching means for energizing only one dial plate display circuit corresponding to said one of said predetermined variables upon presence of said signal from said timer means irrespective of the state of said second switching means.

2. A meter system as claimed in claim 1, wherein said dial plate means comprises a plurality of transparent dial plates substantially arranged in layered fashion, each of said dial plates being carved so as to provide a scale, and means for respectively illuminating said dial plates at an edge of each of said dial plates.

3. A meter system as claimed in claim 2, wherein said scales of said dial plates are arranged so as not to overlap one another.

4. A meter system as claimed in claim 2, wherein said dial plate means further comprises means for blocking the light emitted from the illuminating means for preventing propagations of the light to dial plates other than a corresponding dial plate.

5. A meter system as claimed in claim 1, wherein said first switching means and said second switching means are incorporated in a gang switch.

* * * * *